April 26, 1966   R. P. FRASER   3,248,606
APPARATUS FOR DISPERSING AND ELECTRICALLY CHARGING
SUBSTANCES IN DISCRETE PARTICULATE FORM
Filed Dec. 3, 1962   3 Sheets-Sheet 1

Inventor
R. P. Fraser

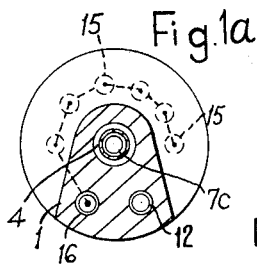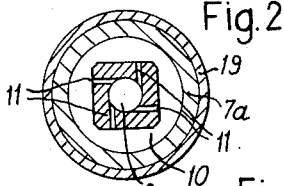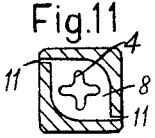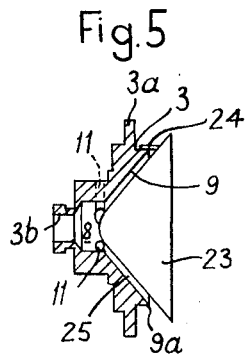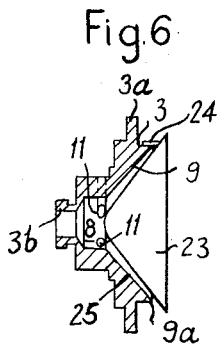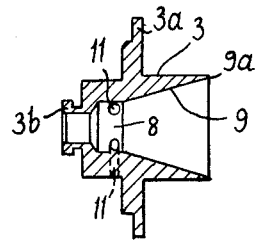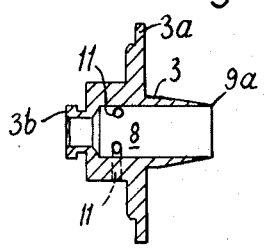

April 26, 1966 R. P. FRASER 3,248,606
APPARATUS FOR DISPERSING AND ELECTRICALLY CHARGING
SUBSTANCES IN DISCRETE PARTICULATE FORM
Filed Dec. 3, 1962 3 Sheets-Sheet 3

Inventor
R. P. Fraser
By
Attorneys

3,248,606
APPARATUS FOR DISPERSING AND ELECTRICALLY CHARGING SUBSTANCES IN DISCRETE PARTICULATE FORM

Reginald P. Fraser, Surrey, England, assignor to Societe Anonyme de Machines Electrostatiques, Grenoble, Isere, France, a corporation of France
Filed Dec. 3, 1962, Ser. No. 242,017
Claims priority, application Great Britain, Dec. 8, 1961, 44,056/61
22 Claims. (Cl. 317—3)

The present invention relates to an apparatus for dispersing and electrically charging substances in discrete particulate form, such as powders, grains or flocking material, more particularly for the purpose of electrostatically dispersing and depositing the particles on an object.

The specification of coassigned United States patent application Serial No. 186,436, filed April 10, 1962, now abandoned, describes a method of and apparatus for the electrostatic deposition of dry powders on an object by discharging the powder through a nozzle of which at least the discharge end is made of conducting material and is connected to one of the poles of a source of high potential of which the other pole is connected to the object, which is normally at earth potential, whereby the powder particles become electrically charged and attracted to and deposited on the object. The powder is fed to the nozzle through a pipe through which air flows as a carrier for the powder. Various nozzle shapes have been used, but the nozzles have to be narrow so as to ensure the particles being charged by contact with the conducting discharge end of the nozzle or by passing through the ionizing field at said discharge end. In hitherto known apparatus the charging of the particles has in certain cases not been satisfactory, the particles have not been evenly dispersed, and difficulty has been experienced due to the nozzle becoming clogged.

The present invention has for its object to provide an improved apparatus, including an improved nozzle, which produces improved dispersion and charging of the particles and overcomes clogging.

To this end, the invention consists in an apparatus for dispersing and electrically charging substances in discrete particulate form, comprising a nozzle connected at one end with a tube through which particles suspended in a gas stream are fed to the nozzle to be discharged from the other end of the nozzle, at least said discharge end of the nozzle comprising conducting material which is connected to a source of electric potential, and means for directing or deflecting said gas stream carrying the particles into a helical path whereby to cause the particles to migrate towards the wall of the nozzle in their movement towards the discharge end of the nozzle. The dispersed particles are thereby electrically charged by reason of their coming into contact with the conducting discharge end of the nozzle or by passing through the ionizing field created by said discharge end.

According to a feature of the invention, the nozzle includes a vortex chamber to which particles suspended in a primary gas stream are fed, the wall of said vortex chamber having at least one gas inlet port which is so arranged that secondary gas fed therethrough will enter the vortex chamber so as to produce a vortex therein and deflect the primary gas stream carrying the particles into a helical path whereby to cause the particles to sweep over or move close to at least the conducting part of the wall of the nozzle in their movement towards the discharge end of the nozzle.

The nozzle may be of uniform cross-section throughout its length or may diverge or converge towards its discharge end. In another form the vortex chamber portion may be of uniform cross-section, the portion of the nozzle downstream thereof diverging or converging towards the discharge end. The discharge end of the nozzle is preferably formed with a sharp lip.

The invention also consists in the novel nozzle constructions herein described.

In order that the invention may be more clearly understood, reference will now be made to the accompanying drawings, in which:

FIGURE 1 is a sectional view of one embodiment of apparatus according to the invention constructed as a hand gun.

FIGURE 1a is a section on the line B—B in FIGURE 1.

FIGURE 2 is a cross-section through the nozzle and its vortex chamber along the line A—A in FIGURE 1.

FIGURES 3 to 8 are cross-sections of further embodiments of nozzles, shown on a somewhat larger scale.

FIGURE 9 is a diagrammatic perspective view of another nozzle, and

FIGURES 10 and 11 are cross-sections of other forms of vortex chamber.

The apparatus shown in FIGURES 1 and 2 is in the form of a hand gun and comprises an elongated body 1 of insulating material provided at one end with a hand grip portion 2 and at the other end with a nozzle 3 which is made of metal or other conducting material, which may be a material having a high electrical resistance. Extending through the body is a passage which accommodates a tube 4 which is connected at its rear end to a pipe shown schematically at 5. The pipe 5 leads to a container 6 for the powder material to be deposited and into which air is supplied in order to produce a low velocity primary air stream for carrying the powder to the gun through the pipe 5. The nozzle end of the tube 4 fits over a hollow spigot 7c of an apertured metal fitting 7 which is provided with a forwardly extending peripheral wall 7a against which rests a flange 3a on the nozzle 3.

The nozzle is held in position by means of a threaded locking ring 19 which engages with the flange 3a on the nozzle and which is screw-threaded on to the external surface of the wall 7a. The nozzle 3 is made with a substantially circular vortex chamber 8 adjacent its inner end 3b, said inner end being located within a recess formed by an annular rib 7b on the fitting 7. The portion of the nozzle downstream of the vortex chamber is formed with a conical divergent internal wall surface 9 and has a sharp lip 9a at the discharge end of the nozzle. The wall 7a defines an annular cavity 10 surrounding the vortex chamber 8 of the nozzle, this cavity 10 being connected to the vortex chamber by inlet ports 11. As can be seen from FIGURE 2, these ports 11 are directed substantially tangentially to the internal wall of the vortex chamber 8 and are preferably disposed symmetrically around the axis of the chamber. In this embodiment four such ports 11 are shown.

The annular cavity 10 connects with another tubular passage 12 extending through the body 1 and connected by a pipe 13 to a source of compressed air. Sealing gaskets 20 may be provided as shown to prevent leakage of air between the various parts of the nozzle assembly.

A high electrical potential is supplied to the nozzle 3 by means of a conductor (part of which is shown at 14), extending through the body 1, and connected at one end to the metal fitting 7 and at its other end to a cable 16 leading to one terminal of a high voltage generator 17, preferably an electrostatic generator. The other terminal of the generator is connected to earth. The conductor 14 may incorporate current limiting resistances 15 (see FIGURE 1a).

The high voltage is of a sufficient value to impart the desired electrostatic charge to the particles and will generally be several kilovolts. The handle portion 2 is provided with a trigger 18, the operation of which actuates a switch 21 controlling the excitation of the high voltage generator and hence the supply of the high voltage to the nozzle. The trigger also operates a valve 22 controlling the supply of secondary air to the nozzle through the passage 12. If desired the trigger 18 can also control the supply of powder and the primary carrier air stream.

In operation, the powder fed into the vortex chamber 8 through the tube 4 is deflected into a helical path by the rapidly rotating vortex within the chamber 8 produced by the velocity of the secondary air entering through the ports 11. The velocity and volume of the primary air carrying the powder is so related to the velocity and volume of the secondary air entering through the ports 11 that the particles will be caused to migrate towards the wall 9 of the nozzle and touch or closely approach the lip 9a upon being discharged from the nozzle, whereby all the particles will become electrically charged upon leaving the nozzle, being discharged from the nozzle in an evenly dispersed manner. Clogging of the nozzle cannot occur.

In one particular embodiment, the vortex chamber 8 of the nozzle had a diameter of 10 mm. and the ports 11 were circular having a diameter of 2 mm. The conical wall surface 9 of the nozzle had an included angle of 55° and the inlet to the chamber 8 from the tube 4 had an internal diameter of 6 mm. The momentum of the secondary gas producing the vortex should be at least twice that of the low velocity primary carrier gas. The nozzle gives an impact area of 30 to 35 cms. diameter and permits a delivery of powder of 7 kg. per hour.

FIGURE 3 is a cross-section through a further embodiment of nozzle, the conical internal wall surface 9 of which subtends an angle of approximately 32°. This less divergent cone angle is used for coating small objects and gives an impact area of 20 to 25 cms. diameter.

FIGURE 4 shows a further embodiment in which the vortex chamber 8 and the discharge orifice of the nozzle are of uniform cylindrical cross-section. The lip 9a is formed by tapering the external surface of the nozzle. This construction is useful in the case where only a small output of powder or other material is required, for example 0.1 kg. per hour, or where a very directive spray is required. The impact area diameter may vary between 5 and 15 cms., according to the air momentum in the vortex.

FIGURE 5 is a cross-section through a further embodiment of nozzle which is intended particularly for the application of powders within a recessed body, for example in the interior of tubes or containers. The conical portion 9 of the nozzle subtends an angle of about 120° and a conical deflector 23 is located within this portion and supported from the nozzle at three equi-spaced points 24. The conically annular passage 25 has a width of about 2 mm. In this way the powder in the neighborhood of the lip 9a of the nozzle is always present in the form of a thin layer which assists the electrical charging of the particles. The vortex effect prevents the powder from clogging the nozzle. Moreover, by reason of the presence of the deflector 23 the vortex effect is enhanced.

FIGURE 6 shows a modification of the nozzle shown in FIGURE 5 wherein the conical downstream portion 9 of the nozzle subtends a smaller angle, e.g. 105°, than the conical deflector 23, e.g. 110°, so that the conically annular passageway 25 between the interior of the mouth of the nozzle and the deflector tapers towards the discharge end of the nozzle. This arrangement helps to obtain a very fine distribution of the powder all around the edge of the nozzle.

In each of the embodiments described above, with reference to FIGURES 3 to 6, the arrangement of the ports into the chamber 8 of the nozzle is similar to that shown in FIGURE 2.

FIGURE 7 shows a further embodiment of nozzle in which the portion of the nozzle downstream of the vortex chamber as well as the deflector 23 comprise flared conical surfaces. Also the nozzle 3 is made in two parts, one of which 3c includes the ports 11 whilst the other 3d comprises the flared conical wall surface 9. This construction is particularly advantageous where the vortex chamber containing the ports is of noncircular cross-section. It enables the part 3c to be molded from a plastic material.

FIGURE 8 shows another nozzle construction which converges towards the discharge end. In this embodiment, a delivery pipe 3e for the powder and carrier gas extends through the vortex chamber and up to the lip at the discharge end of the nozzle, the clearance between the lip and the pipe being from 0.1 to 0.2 mm. This nozzle is suitable for small outputs of very fine powders, with low air velocities.

FIGURE 10 is a cross-section of a non-circular vortex chamber of generally involute cross-section and which has a single port 11 entering into it along a generally spiral path.

FIGURE 11 is a cross-section of another embodiment of non-circular vortex chamber having two symmetrically arranged ports 11. This embodiment also shows the tube 4 feeding the primary gas stream carrying the particles to the vortex chamber as having a star-shaped or cross-shaped cross-section, at least adjacent to the inlet to the vortex chamber, so as to hasten the entrainment of the air carrying the particles towards the wall of the nozzle.

It will be apparent that it is readily possible to interchange the various forms of nozzle one with another by simply unscrewing the locking ring 19, substituting the desired nozzle on the end of the spray gun, and replacing the locking ring.

The apparatus described is particularly suitable for projecting powder or granules of a synthetic resin plastic, such as polyvinyl chloride or nylon, on to an object, such as a metal surface. The charge given to the particles causes them to be deposited on and to adhere to the object which is generally connected to earth potential. By heating the atricle above the melting point of the plastic, either before, during or after the deposition, the adhering layer can be converted into a thin continuous plastic coating.

Instead of creating the vortex by a secondary gas stream separate from the carrier gas stream, the latter may be given a rotational movement as it enters the nozzle and thereby cause the particles to migrate towards the wall of the nozzle. For example, as shown in FIGURE 9, the powder and carrier gas stream arriving in the nozzle 30 have a rotational motion imparted thereto by fixed helical blades 31 disposed in the inlet to the nozzle. The particles in the carrier gas are thereby projected towards the walls of the nozzle and are electrically charged by coming into contact with the lip of the nozzle or by passing through the intense ionizing field in the vicinity of the lip. The lip may be of saw-tooth configuration. In one particular construction, the inlet to the nozzle was 50 mm. diameter and the nozzle had a cone angle of 90°.

In another embodiment, the inlet pipe for powder and carrier gas has a cross-shaped cross-section as shown in FIGURE 11 and is formed with a helical twist so as to impart a rotational movement to the carrier gas as it enters the nozzle. Other non-circular cross-sections of the inlet pipe are possible.

In all embodiments the velocity of the carrier gas may be adjusted in accordance with the patricles to be carried. In the case of a very fine powder the velocity may be very low; for larger particles the velocity must be higher.

Where flocking material is being used it is preferable to increase the diameter of the tube 4.

While particular embodiments have been described, it will be understood that various modifications may be made without departing from the scope of the invention. For example, the apparatus may be constructed in the form of a fixed installation instead of as a portable hand gun. Further, the nozzle can be partially made of or covered with an electrically insulating material, provided that the discharge edge is conductive. The insulating material may conveniently cover the external surface of the nozzle.

I claim:

1. Apparatus for coating objects with a substance in discrete particulate form, comprising a nozzle with an input orifice and a discharge orifice, means connected to said input orifice of the nozzle for feeding particles suspended in a gas stream axially to the nozzle to be discharged from said discharge orifice of the nozzle, at least said discharge orifice of the nozzle comprising conducting material, a source of direct current electric power, one pole of which is connected to said conducting material while the other pole is connected to the object to be coated so as to create an ionizing zone adjacent to the discharge orifice of said nozzle, and means for directing said gas stream carrying the particles into a vortical path to urge said particles away from the axis of said nozzle prior to the time they enter said discharge orifice.

2. Apparatus for coating objects with a substance in discrete particulate form, comprising a nozzle with an input orifice, a diverging discharge orifice and a vortex chamber between said input and discharge orifices of said nozzle, means for feeding particles suspended in a primary gas stream to said input orifice substantially axially of the nozzle, at least one gas inlet port in the wall of said vortex chamber, means for feeding secondary gas to said inlet port so that the secondary gas fed therethrough will enter the vortex chamber so as to produce a vortex therein and deflect the primary gas stream carrying the particles into a vortical path to cause the particles to migrate away from the axis of said nozzle, said nozzle consisting at least in part of conducting material, and a source of direct current electrical power one pole of which is connected to said conducting material of the nozzle while the other pole of said source is connected to the objects to be coated, so as to create an ionizing zone adjacent to the discharge orifice of said nozzle.

3. Apparatus as claimed in claim 1 in which the discharge orifice has a sharp lip of electrically conducting material.

4. Apparatus for dispersing and electrically charging substances in discrete particulate form comprising a divergent nozzle consisting at least in part of conducting material, a source of electrical potential connected to said conducting material, a vortex chamber at the upstream end of said nozzle, means for feeding particles suspended in a primary gas stream substantially axially of the nozzle to said vortex chamber, at least one gas inlet port in the wall of said vortex chamber, and means for feeding secondary gas to said inlet port so that the secondary gas fed therethrough will enter the vortex chamber so as to produce a vortex therein and deflect the primary gas stream carrying the particles into a vortical path to urge said particles away from the axis of said nozzle prior to the time they enter said discharge orifice.

5. Apparatus as claimed in claim 2, in which the vortex chamber is of substantially circular cross-section.

6. Apparatus as claimed in claim 2, in which the nozzle, including the vortex chamber, is of uniform cross-section throughout its length.

7. Apparatus as claimed in claim 2, in which at least the portion of the nozzle which lies downstream of the vortex chamber is of conical shape.

8. Apparatus as claimed in claim 1, in which the discharge orifice diverges towards the discharge end of the nozzle.

9. Apparatus as claimed in claim 8, in which a deflector member is arranged within the nozzle to define a divergent conically annular passageway between the wall of the nozzle and the deflector member.

10. Apparatus as claimed in claim 9, in which the conically divergent annular passageway converges towards the discharge end of the nozzle.

11. Apparatus as claimed in claim 2, in which the wall of the vortex chamber is provided with plural gas inlet ports disposed substantially tangentially to the wall of the vortex chamber and disposed symmetrically therearound.

12. Apparatus as claimed in claim 2, in which the vortex chamber is of generally involute cross-section having a single port entering into it.

13. Apparatus as claimed in claim 2, including means defining an annular cavity for secondary gas surrounding the vortex chamber and communicating therewith by means of at least one port extending through the wall of the vortex chamber.

14. Apparatus as claimed in claim 13, in which the nozzle is detachably mounted in the cavity defining means.

15. Apparatus as claimed in claim 14, in which the nozzle is provided with a peripheral flange, and a threaded locking ring surrounding said flange by means of which the nozzle is secured to the cavity defining means.

16. Apparatus as claimed in claim 2, comprising a body member on which the nozzle is mounted and through which extends a tube for feeding to the nozzle the particles suspended in the primary gas stream, and also a separate passage through which the secondary gas is fed.

17. Apparatus as claimed in claim 16, in which the body portion also contains a conductor for connecting the nozzle to a source of electric potential.

18. Apparatus as claimed in claim 1, comprising an inlet tube of cross-shaped cross-section for feeding the gas stream carrying the particles to the nozzle.

19. Apparatus as claimed in claim 1, wherein the gas stream carrying the particles is deflected into a vortical path by blades disposed in the inlet to the nozzle.

20. In electrostatic spraying apparatus, a nozzle for dispersing and electrically charging substances in discrete particulate form, said nozzle having an axial inlet at one end and a diverging outlet terminating in a sharp lip at its other end, at least said lip consisting of electrically conducting material, and means located within said nozzle for imparting a vortical movement to a gas stream entering the nozzle through said axial inlet to urge said stream away from the axis of said nozzle prior to the time it enters said diverging outlet.

21. Electrostatic spraying apparatus comprising nozzle means having an input orifice and a discharge orifice in coaxial relationship therewith, vortex producing means cooperating with said nozzle means, a supply of coating material, means connected to said supply for feeding a low velocity primary gas stream along a first path to said input orifice, the individual particles of coating material being suspended in said primary gas stream and being directed in substantially linear directions as they move along said first path toward said input orifice, means for feeding a secondary gas stream along a second path to said vortex producing means, the momentum of said secondary gas stream as it enters said vortex producing means being at least twice the momentum of the primary gas stream entering said input orifice, said vortex producing means changing the direction of movement of the individual particles from said linear directions to substantially vortical directions to urge said particles away from the axis of said nozzle means prior to the time they enter said discharge orifice, and means for electrostatically charging said particles prior to their discharge from said discharge orifice.

22. Electrostatic spraying apparatus, comprising nozzle means having an input orifice, a vortex chamber and a diverging discharge orifice arranged in that order along an axis, said vortex chamber including a plurality of gas inlet ports arranged about its periphery and extending tangentially with respect thereto, a supply for coating material, means connected to said supply for feeding a low velocity primary gas stream along a first path to said input orifice, the individual particles of coating material being suspended in said primary gas stream and being directed in substantially linear directions as they move along said first path toward said input orifice, means for feeding a secondary gas stream along a second path to the inlet ports of said vortex chamber, the momentum of said secondary gas stream as it enters said chamber being at least twice the momentum of the primary gas stream entering said input orifice, said secondary gas stream deflecting said primary gas stream to change the direction of movement of the individual particles therein from said linear directions to substantially vortical directions and thereby urge said particles away from the axis of said nozzle means prior to the time they enter said discharge orifice, and means for electrostatically charging said particles prior to their discharge from said discharge orifice.

References Cited by the Examiner

UNITED STATES PATENTS

| | | | |
|---|---|---|---|
| 1,832,096 | 11/1931 | Chaffee et al. | 239—15 |
| 1,928,963 | 10/1933 | Chaffee | 239—15 |
| 2,120,388 | 6/1938 | Bargeboer | 239—15 |
| 2,302,289 | 11/1942 | Bramston-Cook | 239—3 |
| 2,710,773 | 6/1955 | Sedlacsik | 239—15 |
| 2,759,763 | 8/1956 | Juvinall | 239—3 |
| 2,904,263 | 9/1959 | Tate et al. | 239—468 X |
| 2,923,272 | 2/1960 | Emmert | 239—15 |
| 2,975,755 | 3/1961 | Reindl | 239—3 |
| 3,026,787 | 3/1962 | De La Combe | 239—468 |
| 3,048,498 | 8/1962 | Juvinall et al. | 239—3 |
| 3,082,956 | 3/1963 | Point | 239—15 |
| 3,167,255 | 1/1965 | Point et al. | 317—3 X |

FOREIGN PATENTS

| | | |
|---|---|---|
| 1,005,450 | 4/1952 | France. |

SAMUEL BERNSTEIN, *Primary Examiner.*

EVERETT W. KIRBY, *Examiner.*

D. YUSKO, *Assistant Examiner.*